United States Patent [19]

Overhoff et al.

[11] 4,279,697
[45] Jul. 21, 1981

[54] METHOD OF AND APPARATUS FOR SHUTTING DOWN A GAS-COOLED NUCLEAR REACTOR

[75] Inventors: Theodor Overhoff, Niederzier; Rudolf Schulten, Aachen-Richterich; Jasbir Singh, Jülich; Gerd Sylvester, Leverkusen; Josef Witte, Cologne, all of Fed. Rep. of Germany

[73] Assignees: Kernforschungsanlage Jülich Gesellschaft mit beschrankter Haftung, Jülich; Bayer AG, Leverkusen, both of Fed. Rep. of Germany

[21] Appl. No.: 964,937

[22] Filed: Nov. 30, 1978

[30] Foreign Application Priority Data

Dec. 3, 1977 [DE] Fed. Rep. of Germany ....... 2753928

[51] Int. Cl.³ .............................................. G21C 7/06
[52] U.S. Cl. .................................. 176/22; 176/58 PB; 176/86 L; 176/93 BP
[58] Field of Search .................. 176/22, 58 R, 58 PB, 176/59, 60, 86 G, 86 L, 91 SP, 92 A, 93 R, 93 BP, DIG. 5; 260/429.2, 448 R, 448 AD; 423/263

[56] References Cited

U.S. PATENT DOCUMENTS

| | | | |
|---|---|---|---|
| 2,953,586 | 9/1960 | Hafner | 260/429.2 |
| 2,987,455 | 6/1961 | Huston | 176/DIG. 5 |
| 3,071,605 | 1/1963 | Morehouse | 260/429.2 |
| 3,757,412 | 9/1973 | Mazdiyasni | 260/429.2 |
| 4,113,559 | 9/1978 | Schweiger | 176/58 PB |

OTHER PUBLICATIONS

Spera, et al., Poison Retention in Reactor Fuses, (NSA 12: 13452), Aug. 1957, 17 p.

*Primary Examiner*—Donald P. Walsh
*Attorney, Agent, or Firm*—Karl F. Ross

[57] ABSTRACT

A gas-cooled nuclear reactor whose nuclear-fuel elements are constituted by graphite-encapsulated nuclear fuel particles and have graphite coatings is shut down in accordance with the present invention by introducing into the primary coolant gas circulation, a gadolinium-containing substance which is dispersed in the primary cooling gas before the latter enters the space between the fuel elements within the reactor core so that the gadolinium-containing substance is at least partly deposited on the free graphitic surfaces of the fuel elements.

27 Claims, 4 Drawing Figures

GAS FLOW

METHOD OF AND APPARATUS FOR SHUTTING DOWN A GAS-COOLED NUCLEAR REACTOR

FIELD OF THE INVENTION

The present invention relates to a method of shutting down a gas-cooled nuclear reactor and particularly a gas-cooled nuclear reactor whose nuclear-fuel element comprises fissionable material embedded in graphite and having a graphitic surface exposed to the gas within the nuclear reactor core. The invention also relates to an apparatus for shutting down such a reactor.

BACKGROUND OF THE INVENTION

In nuclear reactors, there is generally provided a so-called primary shutoff system which can include control rods or shutoff rods which can be inserted to various degrees into the reactor core and consisting of a neutron-absorptive solid material.

The shutdown of a nuclear reactor is generally a result in the interruption of the fission reaction by absorbing a substantial part of the neutron flux by such control or shutdown rods which prevent the absorbed neutrons from participating in further chain reactions.

To increase the safety of the reactor, at least one further shutdown system is generally provided, the further or second shutdown system being operated independently from the first and being designed to reduce the neutron flux and thereby limit the reactivity of the nuclear reactor.

In most existing systems, the secondary shutdown system, like the primary shutdown system, is characterized by the possibility that, after elimination of the emergency condition which triggered its operation, the reactor activity can build up again.

Naturally, this should not be the case for an emergency shutdown system intended to prevent reactivation of the nuclear reactor, for example, when the power-generating unit of a power-generating nuclear reactor fails. Hence it is desirable to provide a secondary shutdown system which acts practically irreversibly in certain situations but reversibly in others.

There are a number of processes which have been used heretofore for the shutdown of nuclear reactor installations. For example, it has been proposed in German Patent Publication (Auslegeschrift) DT-AS No. 14 89 832 with means for introducing into the liquid-metal coolant, a metal soluble therein and having a large neutron-absorption cross section. For sodium-cooled nuclear reactors, the additive is lithium (Li), rubidium (Rb) and cesium (Cs). The neutron-absorbing agent can be introduced into the liquid-metal coolant to shut down the nuclear reactor ahead of the inlet for the coolant into the reactor core via venturi nozzlers (see German Patent Publication-Offenlegungsschrift-No. 21 14 008).

These additives can be removed from the sodium melt by skimming from the surface.

For a fresh startup, the sodium melt is treated with nitrogen. Experience has shown that with the use of lithium as an additive, an insoluble lithium nitrogen compound forms in the sodium melt and makes the startup of the nuclear reactor difficult.

For gas-cooled nuclear reactors, it is proposed in German Patent Publication (Offenlegungsschrift) No. 18 04 336 to flood the nuclear reactor core with neutron-absorbing liquids through a pipe system. Such a pipe system is, however, difficult to provide in most gas-cooled nuclear reactors. Mention should also be made of the fact that it is known to flood control rods which are insertable into the reactor core (see German Patent Publication-Offenlegungsschrift-DT-OS No. 18 01 395). The difficulty with the latter system is that the secondary shutdown arrangement is not independent from the functioning of the control rods and hence cannot be properly used as a secondary safety or shutdown arrangement in the manner described previously.

From German Patent Publication (Offenlegungsschrift) DT-OS No. 18 09 399, there is known a system for shutting down a gas-cooled nuclear reactor by the introduction of neutron-absorbing material in solid form over separate pipes provided in the interior of the reactor core. The installation of special pipes for this purpose, however, poses a problem in most gas-cooled nuclear reactors because of the structural or technological disadvantages. These disadvantages can be avoided with a shutdown process of the type described in German Patent Publication (Offenlegungsschrift) No. 25 16 123, in which, in an emergency, the reactor is flooded with de-ionized water to which the absorbing agent has been added. A process of the latter type can, however, only be used at low temperatures since at higher temperatures substantial steam generation must be reckoned with and damage to other units of the nuclear reactor must be considered, especially when the primary cooling cycle includes turbines. The flooding with water is therefore used only in the most extreme emergencies.

German Patent Publication (Auslegeschrift) No. 10 69 303 proposes the addition to the cooling medium of neutron-absorbing metal particles, for example cadmium particles. German Patent Publication (Offenlegungsschrift) DT-OS No. 23 25 828 describes a system in which a circulating-ball reactor is shut down by the addition of balls of absorbing material to the reactor core, the absorber balls being introduced into the interstices between the nuclear-fuel balls of the reactor core. The introduction into the coolant of metal particles or the introduction into the reactor core of absorber balls permit removal only upon withdrawal of at least a portion of the fuel elements from the reactor core. To facilitate removal of the absorber balls, for example, special reactor core bottoms must be provided.

Mention should also be made of the system described in German Patent Publication (Auslegeschrift) DT-AS No. 11 23 415 which describes the admixture to the coolant of a neutron-absorbing gas, for example, boron trifluoride ($BF_3$). Such gases are dispersed, after introduction into the coolant, over the entire cooling cycle so that large gas quantities must be used to shut down the nuclear reactor and considerable difficulty is created in removing the absorptive gas from the cooling-gas stream subsequently. The use of $BF_3$, moreover, results in deterioration of the reactor system because of the high corrosivity of this agent. Here again, the use of this method is practical only in the most dangerous or emergency conditions.

OBJECTS OF THE INVENTION

It is the principal object of the present invention to provide a method of shutting down a gas-cooled nuclear reactor of the type described without the dangers of the earlier systems described above and enabling re-starting of normal operations in a simple manner.

Another object of the invention is to provide a system for the shutdown of a nuclear reactor, especially for use as a secondary shutdown system, which can be operated at relatively low cost, requires a minimum of capital expenditure to add to existing installations, and which is suitable for both temporary and emergency shutdown of a gas-cooled reactor core.

Still another object of the invention is to provide an improved apparatus for use in the shutting down of a gas-cooled nuclear reactor of the type described.

SUMMARY OF THE INVENTION

These objects and others which will become apparent hereinafter are attained, in accordance with the present invention, in a process for the shutting down of a gas-cooled nuclear reactor and particularly a gas-cooled reactor of the type in which the nuclear fuel elements comprise fissionable particles embedded in graphite bodies and wherein the graphite bodies have a graphite surface exposed to the primary coolant in the nuclear reactor core. According to the invention, the primary gas coolant is used for the distribution of transport into the reactor core and within the reactor core of a neutron-absorbing agent which can remain within the nuclear reactor cor and whose neutron-absorbing effect does not prevent re-establishment of the normal operations of the reactor.

More particularly, the invention comprises introduction into the primary coolant circulation, upon or immediately ahead of the introduction of the coolant into the nuclear reactor core, of a gadolinium-containing substance which, after dispersion in the cooling gas by introduction into the gas before it enters between the nuclear fuel elements, effects at least a partial deposition of the gadolinium-containing substance upon the free graphite surfaces of the fuel elements within the reactor.

The substance thus serves as a carrier for the gadolinium which is introduced into the nuclear reactor and permits its distribution into the primary-coolant gas.

The method of the present invention makes use of the high absorption effect of the gadolinium isotope 157 which is thereby introduced into the nuclear reactor. The effective cross section for thermal neutrons at room temperature of gadolinium 157 is $2.5 \times 10^5$ barn. The effective cross section for the natural isotopic mixture of gadolinium is $4 \times 10^4$ barn. As a result, the deposition of a relatively small quantity of gadolinium in the highly porous graphitic surface of the fuel elements can result in a sharp reduction in the activity of the reactor.

As opposed to other neutron-absorbing elements, the deposition of gadolinium in the graphite of the nuclear-fuel elements is tolerable even where re-startup of the normal reactor operations is contemplated. The reason for this is that, on the one hand, the gadolinium isotope 157 upon neutron absorption undergoes nuclear reaction in accordance with the process 157—Gd (n,γ) 158—Gd to a stable isotope which has minimal effect on the neutron balance during normal operation of the nuclear reactor, i.e. has a comparatively low neutron cross section. On the other hand, the high neutron cross section upon initial introduction of the gadolinium into the reactor ensures a rapid burnoff of the gadolinium so that even traces of gadolinium remaining in the cooling gas have no noticeable negative effect on the restarting of the reactor.

According to a feature of the invention, the gadolinium-containing substance is metered into the cooling gas in amounts designed to bring about a predetermined reactivity reduction in the nuclear reactor core. This is most advantageously used to control the reactivity during normal operations. We have found that the small amounts of gadolinium which are employed in this manner are extremely rapidly absorbed on the largely porous surfaces of the graphite fuel elements so that residues in the coolant are small and the control system has an excellent response rate.

The suitable gadolinium-containing substances for use with the invention will, of course, depend upon particular requirements. In the best mode currently known to us for carrying out the invention in practice, an aqueous gadolinium acetate solution is sprayed into the cooling gas upon the introduction of the latter into the reactor core. Gadolinium acetate has good solubility in water and the solution has been found to be particularly effective in shutting down a nuclear reactor before the latter has been placed in full normal operation. The liquid can be metered simply into the gas and the solution can be produced without difficulty.

The gadolinium acetate solution is especially effective for emergency shutdown of the nuclear reactor and, indeed, is preferred for this purpose since the natural head of the liquid can be used to introduce it into the reactor upon failure of forced-displacement systems. It thus may be used effectively in a so-called passive shut-off system.

When the reactor is operated at relatively low temperatures, the gadolinium-containing solution can readily wet the surface of the graphite elements and, at least in this case, has a preferred concentration of up to 5% by weight of gadolinium acetate.

According to another feature of the invention, the gadolinium is introduced into the cooling gas in the form of a gadolinium-containing organic compound which is resistant to a temperature of about 150° C. and whose vapor pressure is satisfactory up to a temperature of about 500° C. so as to deposit the gadolinium to a predetermined reactivity-decreasing degree upon the free graphitic surfaces of the nuclear-fuel elements.

The temperature resistance of the organic compound is a measure of its ability to be stored over long periods.

The resistance to temperatures up to 150° C. reduces any tendency for premature decomposition before the gadolinium compound enters the reactor core. Suitable organic compounds have a sufficiently high vapor pressure to ensure that reactivity-reducing quantities of gadolinium can be introduced into the coolant gas. Preferably the organic compounds are polycyclic compounds of which the best has been found by us to be gadolinium-tricyclopentadienyl $(Gd(C_5H_5)_3)$. This compound sublimates under the conditions prevalent during shutdown of a gas-cooled nuclear reactor. Preferably the gadolinium-tricyclopentadienyl is introduced by passing at least a portion of the cooling gas before it is admitted to the reactor core over the gadolinium-tricyclopentadienyl in the solid phase.

Organic compounds which have a sufficiently high vapor pressure to allow them to be introduced in a similar manner into the cooling gas stream are the gadolinium-aluminum alkyl oxide compounds, especially gadolinium-aluminum-isopropoxide $(Gd(Al(C_3H_7O)_4)_3)$. This compound has a melting point of 92° C. and a sufficient wettability for fibrous material to allow the gadolinium-aluminum isopropoxide to saturate a fiber fleece over which a portion (at least) of the reactor coolant gas is passed before it is introduced into the nuclear reactor.

An apparatus for carrying out the process of the invention, i.e. for shutting down a nuclear reactor or controlling the reactivity thereof, especially when the reactor core is constituted with nuclear-fuel elements which constitute graphite bodies in which nuclear-fuel particles are embedded and which have a graphitic surface, comprises the primary coolant circulation whereby a cooling gas is passed through the reactor core in direct contact with the surfaces of these nuclear-fuel elements, and means for introducing the gadolinium-containing compounds into the cooling-gas stream upon its entry into the reactor core.

In the best-mode embodiment of the invention, the latter means comprises spray nozzles which are disposed within the reactor in the region in which the cooling gases are admitted to the core, i.e. at the inlet for the cooling gases. More specifically, the nozzles spray into the core in the region in which the cooling gas is introduced, i.e. in the space within which the cooling-gas inlet opens.

At least one feed conduit is connected to the spray nozzles and is in communication with a supply vessel which preferably is emptiable by gravity through this conduit. The supply vessel or receptacle contains the gadolinium compound. Control means, e.g. a valve which may be responsive to pressure and which can withstand the pressure within the reactor core, can be provided so that this device can be opened in the event shutdown is required to allow the admission of the gadolinium compound. Upon opening of the valve, therefore, the spray nozzles disperse the gadolinium compound into the cooling gas whereby the gadolinium compound is carried onto the fuel element surfaces and the gadolinium is deposited thereon.

The valve arrangement or, more generally, the control means, is so constructed and arranged that it can be held closed by or maintain a pressure within the reactor core above that in the supply vessel at least until shutdown is required.

A distribution of the gadolinium-containing substance so that, upon restarting of the nuclear reactor, there is only a minimal distortion of the radial and axial loading profiles of the reactor core which is attained in that the spray nozzles open into the space in the reactor core which is traversed by the cooling gas between the top reflector and the first layer of nuclear-fuel elements, the number and throughput of the nozzles being determined by the neutron flux distribution in the reactor core upon restarting of the reactor.

To enable the gadolinium-containing substance to be metered into the reactor core in accordance with the required reactivity reduction, at least one dosing or metering pump can be connected to a supply vessel for the gadolinium-containing liquid to introduce this substance into at least one feed conduit.

When it is desired to use the shutoff system described for an emergency shutdown of the nuclear reactor, the supply vessel should be connected to at least one feed line which opens via at least one spray nozzle into the reactor core in such manner that the natural head of liquid in the supply vessel can discharge the liquid carrying the gadolinium-containing substance into the coolant stream. The outlet of this nozzle and/or a valve in the feed line thereto can be provided with temperature-responsive means which, in the case of an excessive temperature in the reactor, will open to permit the head of liquid to drive the gadolinium-containing substance into the nuclear reactor. Preferably, the closure is a fusible element melting at a predetermined temperature representing an emergency situation. In this case, the pressure in the supply vessel during normal operation of the reactor should be equal to the pressure generated in the reactor core.

This type of passive safety device is advantageous, especially where there is pressure equalization between the supply vessel and the interior of the reactor, since in an emergency situation the gadolinium-containing substance will be introduced by its natural head without any mechanical means (e.g. pumps or the like) rapidly into the reactor. Preferably, in this instance, the gadolinium-containing substance is aqueous gadolinium acetate solution.

A further shutoff device in accordance with the principles of the invention for a reactor of the type described comprises a bypass from the main cooling stream of the primary coolant which includes means for passing the gas over a gadolinium-containing substance with a sufficiently high vapor pressure.

A portion of the cooling gas thus traverses the bypass, being diverted from the main cooling duct, to a hermetically sealed supply vessel containing the gadolinium compound, a valve being provided for controlling the flow through the bypass or blocking this flow. The valve is designed to resist a pressure differential thereacross and is capable of establishing a pressure differential between the main gas line and the supply vessel.

In this embodiment of the invention, the gadolinium-containing substance is introduced into the gas stream also without any mechanical means for dispersing the substance. The cooling gas picks up the gadolinium-containing substance by entrainment because of the high vapor pressure.

The obturating means for the supply is impermeable to the gadolinium-containing substance. For pressure equalization, the supply vessel can be provided with an atmosphere corresponding to the cooling gas and may be connected by a conduit to the main cooling gas line for pressure equalization so that the pressure prevailing in the main cooling gas duct is also applied to the vessel.

In still another embodiment of the invention, the supply vessel is connected with a cooling-gas accumulator which supplies the cooling gas to the gadolinium-containing supply vessel. The advantage of a cooling-gas accumulator is that it permits the cooling gas to carry the gadolinium-containing substance into the reactor in the event of failure, malfunction or interruption of the main cooling-gas circulating duct.

To establish a sufficient vapor pressure of the gadolinium-containing substance in the supply vessel, the invention provides for a heating means along the path of the cooling gas to the supply vessel in which it is brought to a temperature such that the desired quantity of the gadolinium-containing compound will be entrained with this cooling gas by virtue of the vapor pressure established at this temperature.

Advantageously, a solid grid, openwork or the like of gadolinium tricyclopentadienyl is provided, this compound subliming into the cooling gas upon traversal thereby of the grid. When a higher vapor pressure is desired in the gadolinium-containing substance, the compound used can be gadolinium-aluminum-isopropoxide which is preferably introduced into the supply vessel in a fiber mat or fleece soaked in the gadolinium-aluminum-isopropoxide.

So that the shutdown device is independent of the cooling-gas stream in the main cooling-gas conduit, the supply vessel may be connected with a bypass from an auxiliary cooling-gas line. The auxiliary cooling-gas system may be a gas line connected to the waste-heap recovery system or an afterheating system, or any other cooling-gas source. Naturally, the auxiliary cooling-gas cycle may be provided with any of the shutoff systems described above in which gadolinium-containing compounds are stored. In addition, the auxiliary cooling-gas cycle and the main cooling-gas system can each be provided with gadolinium-dispersal systems of the type described.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
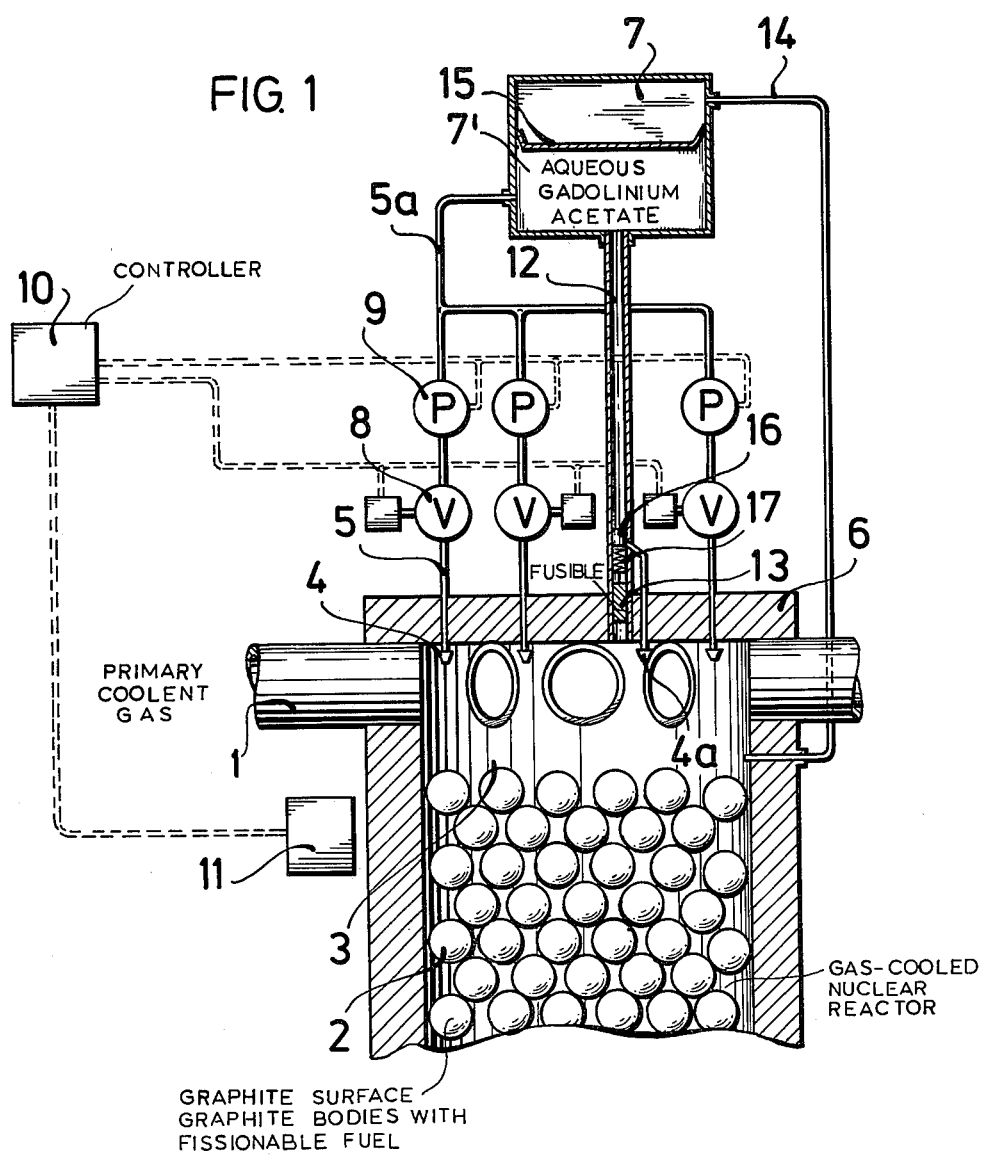
FIG. 1 is a diagrammatic vertical section and partial block diagram of a shutoff system for a nuclear reactor provided with spray nozzles.
Figure 2:
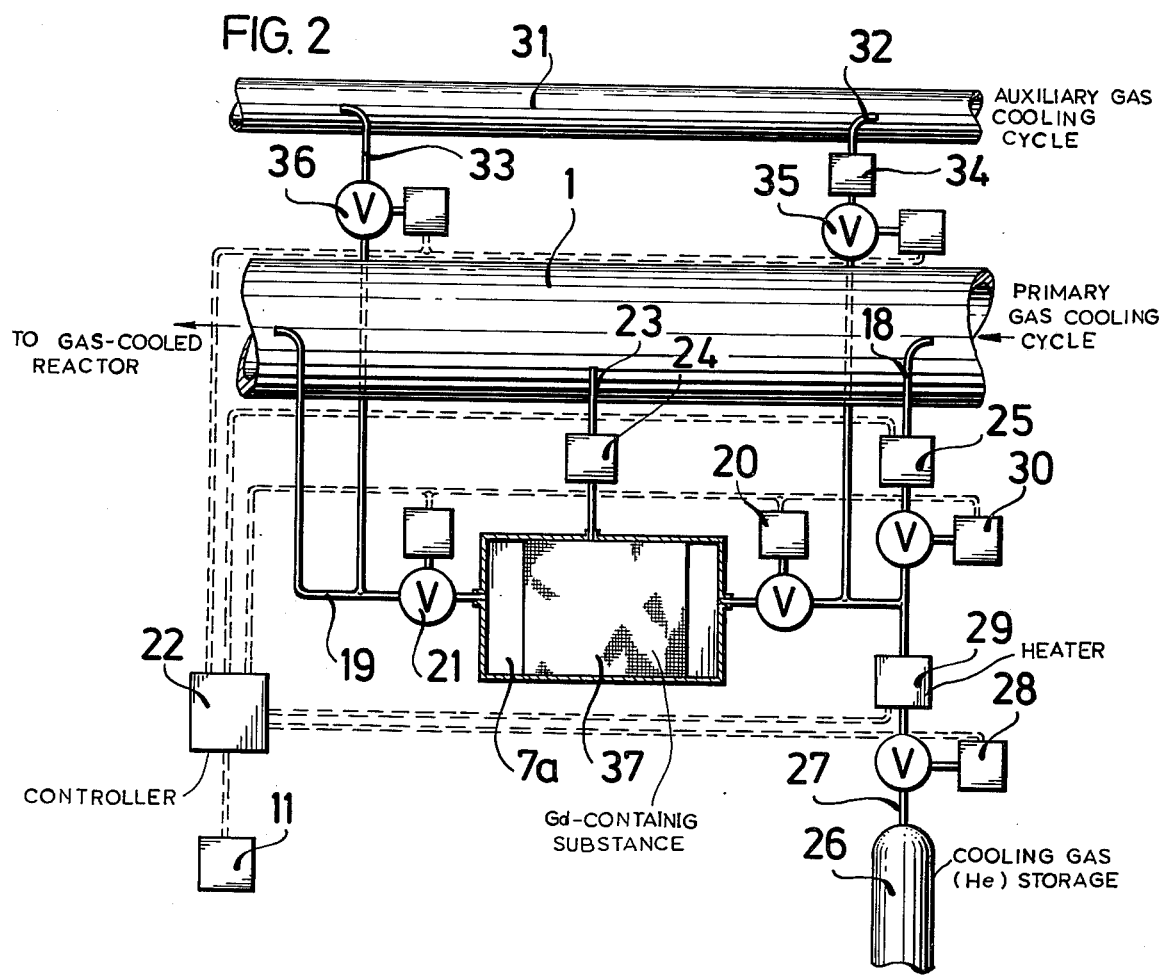
FIG. 2 is a view similar to FIG. 1 but illustrating a system in which the shutoff arrangement is provided in a bypass of the main cooling gas line.

It should be noted that the embodiments of FIGS. 1 and 2 can be combined, i.e. that a nuclear reactor of the type shown in FIG. 1 can also be provided with the shutdown system of FIG. 2 in addition to that of FIG. 1 if duplicate shutdown systems are desired for greater safety.

As has been schematically shown in FIG. 1, a shutdown for a gas-cooled nuclear reactor comprises the main cooling-gas conduit 1 which forms the inlet system of the primary coolant of the reactor, the gas being intended to come into contact with the nuclear-fuel elements 2 filling the reactor core 3.

The nuclear-fuel elements 2 constitute graphite bodies in which are embedded nuclear fuel particles, e.g. graphite-sheathed nuclear fuel particles. The nuclear fuel elements have graphitic exposed surfaces coming in contact with the cooling gas.

The cooling gas traverses the reactor core 3 and directly contacts the surfaces of the nuclear fuel elements, being thereby heated. The heat of the cooling gas is, of course, transferred to the secondary cooling gas cycle which can be used to generate electricity in any conventional manner or for any other purpose.

In high-temperature reactors, the cooling gas enters at a temperature between 300° C. and 500° C. into the reactor core in normal operations and is heated to a temperature of up to about 1000° C. The cooling gas is usually helium or some other inert gas.

For the shutdown of the nuclear reactor temperatures are encountered which range between room temperature and the operating temperatures described.

In the region of the inlets for the cooling gas into the reactor core, the invention provides, in the embodiment of FIG. 1, spray nozzles 4 which introduce a liquid carrying a gadolinium-containing substance. The spray nozzles 4 are each provided at the end of a supply line 5 passing through the top reflector 6 of the reactor core and communicating collectively, e.g. via a manifold 5a, with a supply vessel 7 for the gadolinium-containing substance.

Each of the supply lines or conduits 5 is provided with a closure to protect against undesired introduction of the gadolinium-containing substance during the normal operating phases of the nuclear reactor. Each of these closures is a valve 8. In the embodiment illustrated in FIG. 1, each of the feed lines 5 is provided with a metering or dosing pump 9 which is connected to the manifold 5a.

The dosing pumps are, in turn, operated by a controller in dependence upon the requisite reduction in the reactivity of the reactor to bring about the desired reduction. The controller is provided with a sensor 11 which is capable of measuring the value of the neutron multiplication rate.

The sensor 11 provides an actual value signal in feedback to the controller 10. The metering pumps 9 thus may be servocontrolled pumps. The valves 8 can also be operated by the controller 10 to open when metering of the liquid from the vessel 7 is desired.

The spray nozzles 4 which open into the reactor between the top reflector 6 and the first layer of nuclear-fuel elements 2, can be provided with metering pump 9 with different rates of flow or throughputs so that the gadolinium-containing substance can be distributed over the reactor core zonewise in a controllable manner to bring about the desired reduction in neutron flux uniformly and without allowing hot spots to develop. However, it is also possible to control the feed rate for the gadolinium-containing substance to different zones in the reactor core by selectively distributing the number of nozzles per unit area in these zones rather than regulating the throughputs per nozzle.

In the embodiment shown in FIG. 1, a larger number of nozzles can be provided along the periphery of the core so that a greater quantity of the gadolinium-containing substance is provided in these regions than in the central region, thereby enabling a uniform neutron flux distribution in the reactor core upon restarting of the nuclear reactor. Nevertheless the controller or a series of controllers can be provided to supply the desired distribution of the gadolinium-containing substance.

For emergency shutdown of the nuclear reactor, a larger-diameter feedline 12 is provided, this line being connected upstream of its end opening into the reactor core with a spray nozzle 4a having a fusible closure 13 which melts upon the temperature within the reactor overstepping a predetermined maximum allowable temperature. Thus, upon fusing or melting of this member 13, e.g. a plug, the gadolinium-containing substance contained in the vessel 7 is discharged rapidly and completely into the interior of the reactor. This distribution is achieved by the natural head of liquid in the vessel 7. To ensure that gravity will be effective alone (i.e. without pumps or the like) to discharge the vessel 7 into the reactor core upon melting of element 13, it is important to ensure pressure equalization between the reactor core and the vessel 7. To this end, a bridge conduit 14 is provided between the reactor core and the head space in the vessel 7. The vessel 7 is advantageously subdivided between the gas space and the liquid storage space 7' by a membrane 15 which is impermeable to the gadolinium so that no gadolinium can diffuse back through line 14 into the reactor core. For this reason as well the valves 8 are impermeable to the gadolinium-containing substance in their closed condition.

Above the fusible element 13 in line 12 there can be provided a stopper or plug 16 which is held by a spring support in place relative to the fusible element 13. Thus this plug is released only upon melting of the fusible element 13 and under the pressure of the head of liquid to shift the plug 16 and open the nozzle 4a.

In the embodiment of the shutoff device shown in FIG. 1, the gadolinium-containing substance is an aqueous gadolinium-acetate solution with a gadolinium acetate content of 5% by weight.

FIG. 2 shows schematically a shutdown device for a nuclear reactor, e.g. of the type illustrated in FIG. 1, whose supply vessel 7a contains a gadolinium compound and is connected by a bypass 18, 19 to the main cooling duct 1 so that at least a portion of the cooling gases can traverse the bypass. The bypass 18, 19 is connected to the cooling gas line only shortly ahead of the inlet of the cooling gas line into the nuclear reactor.

The supply vessel 7a is closed relative to the primary cooling conduit by means of valves 20 and 21 which are operated by a controller 22 in the event shutdown is required or a reduction in the reactivity of the reactor is desired. The shutoff valves 20 and 21, in their closed conditions, are impermeable to the gadolinium compound stored in the vessel 7a.

The storage vessel 7a is provided with an atmosphere corresponding to the cooling gas and which may be supplied by a conduit 23 via a throttle 24 for pressure equalization in the manner described with respect to the conduit 14.

The throttle 24 can be constituted by, for example, a capillary tube so that diffusion of gadolinium vapors in the reverse direction from the vessel 7a is minimized.

In the bypss 18, 19 there is provided a flow-measuring device 25 whose output serves as an input for the controller 22. In accordance with the set-point value of the flow, the circle valves 20 and 21 are operated by the controller 22. The feedback is here provided by the flow-measuring device 25.

In addition, we may provide a cooling-gas accumulator or storage unit 26 which can feed cooling gas directly through the vessel 7a to the main cooling duct or to the reactor. This supply 26 can be effective in the event of failure of the main cooling line.

The cooling gas tank 26 is connected with the supply vessel 7a by a valve 28 operated by the controller 22 in a cooling-gas conduit 27.

In order to develop the necessary or desired vapor pressure of the gadolinium-containing solid in the vessel 7a, the cooling-gas line 27 or the bypass portion 18 or both can be provided with heating chambers 29 and 25 to bring the gas, prior to its entry into the vessel 7a, to a temperature sufficient that the vapor pressure of the gadolinium-containing substance at this temperature will correspond to the requisite quantity of gadolinium in the gas fed to the reactor. When the supply vessel 7a is traversed by the cooling gas from the tank 26, a valve 30 in bypass portion 18 can be closed.

Parallel to the bypass 18, 19 the supply vessel 7a is also connectable to an auxiliary cooling gas line 31. The auxiliary gas line 31 can be a duct of an emergency shutdown system supplying gas from any desired source or simply a further cooling gas system which can be operated as required. The auxiliary cooling gas system 31 is provided with a bypass 32, 33 with a flow-measuring device 34 adapted to provide an input to the controller 22 which operates the valves 35 and 36 in the bypass. Naturally, a separate vessel similar to that shown at 7a or controller 22 can be provided for the auxiliary cooling system 31 and the bypass 32, 33 itself.

Figure 3:
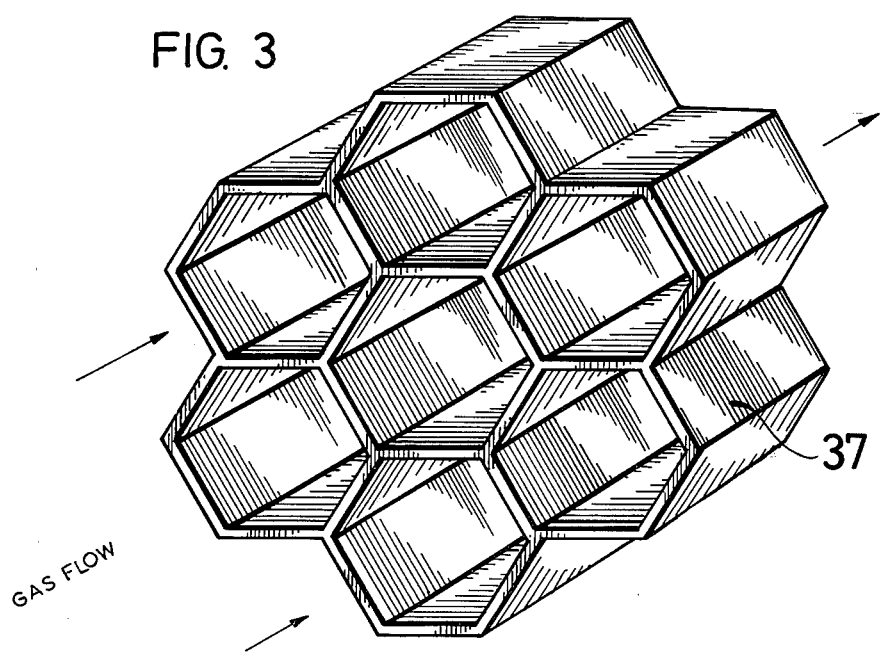
FIG. 3 is a perspective view of a solid grid of gadolinium-tricyclopentadienyl according to the invention.

The supply vessel 7a preferably contains a solid grid 37 of gadolinium tricyclopentadienyl which can have the construction shown in FIG. 3. In this embodiment, the grid has a honeycomb structure and is traversed in the axial direction by the cooling gas. The grid has been indicated at 37. The gadolinium tricyclopentadienyl sublimes from the solid and enters the gas at a corresponding vapor pressure. Naturally, instead of the solid grid 37, the supply vessel 7a can contain a fiber fleece, e.g. of glass fibers, which can be saturated in the liquid gadolinium aluminium isopropoxide. This fiber fleece can also have the honeycomb structure shown in FIG. 3.

Figure 4:
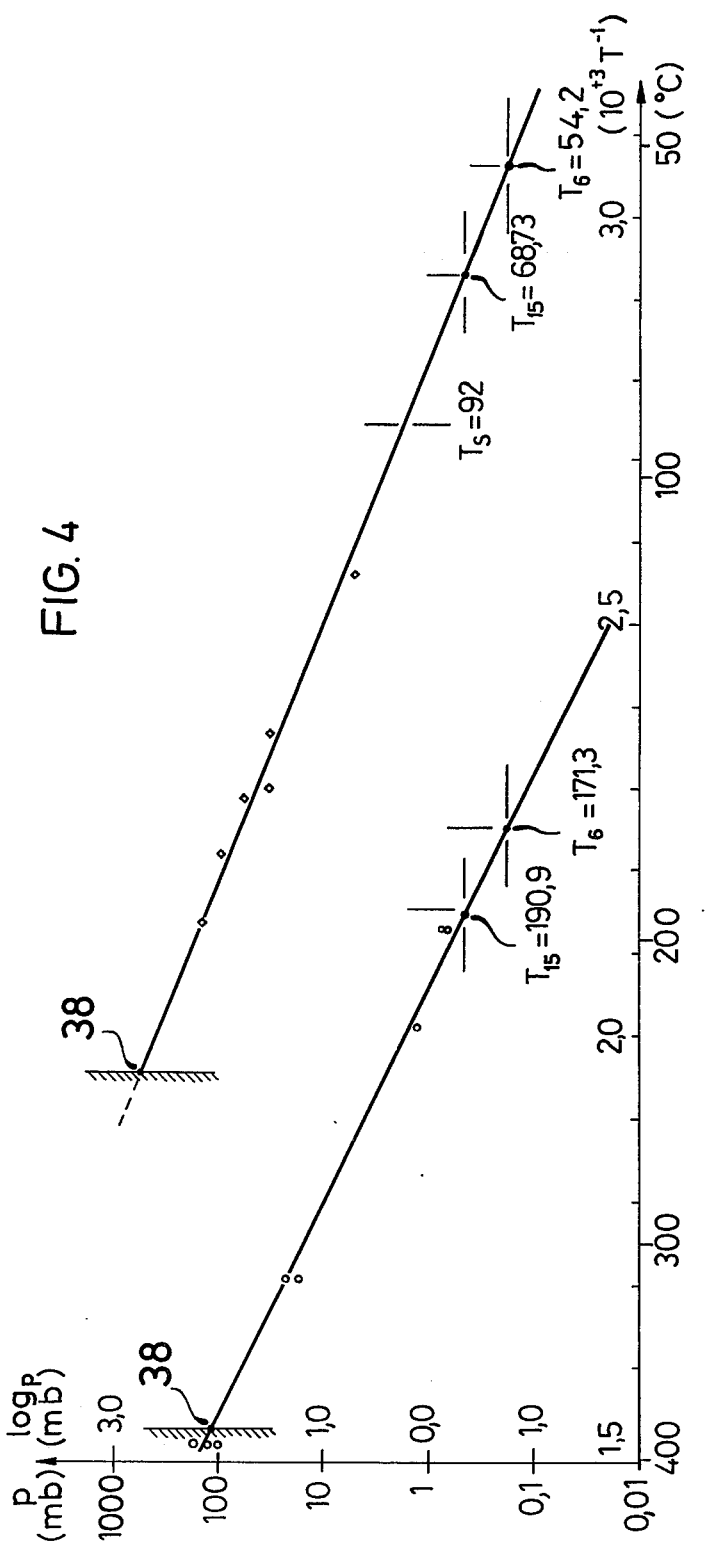
FIG. 4 is an illustration of the thermodynamic characteristics of gadolinium-tricyclopentadienyl and gadolinium-aluminum-isopropoxide.

FIG. 4 shows the vapor pressure relationships for the gadolinium-containing organic compounds gadolinium tricyclopentadienyl and gadolinium-aluminium-isopropoxide in a log p v 1/T diagram.

For the values for gadolinium tricyclopentadienyl, circles have been used in the diagram while squares have been used to indicate the points for the gadolinium-aluminium-isopropoxide.

From the limits of thermal stability shown in the diagram (reference numeral 38) it is apparent that both of the organic compounds are stable to temperatures above about 150° C. With gadolinium tricyclopentadienyl, a pyprolisis occurs at about 400° C. while the gadolinium-aluminium-isopropoxide is stable until a temperature of about 250° C.

Both organic compounds can be stored for long periods of time in the vessel 7 or 7a.

For a reactivity reduction of about 6 Nile approximately 150 grams of gadolinium is required for a reactivity reduction of about 1 Nile with a vapor pressure of about $1.5 \times 10^{-1}$ millibar. This vapor pressure is attained with gadolinium tricyclopentadienyl at a temperature of about 170° C. Gadolinium-aluminum-isopropoxide has such a vapor pressure at about 54° C. Thus heating may be provided to these temperatures as required.

If a reduction of reactivity of about 15 Nile is desirable, it is important to raise the vapor pressure to about $5 \times 10^{-1}$ mb. For this a temperature of above 190° C. is required for the gadolinium tricyclopentadienyl and above 69° C. for the gadolinium-aluminum-isopropoxide. The corresponding values have been represented in the diagram at the temperatures $T_6$ and $T_{15}$, respectively. At $T_S = 92°$ C., gadolinium aluminum isopropoxide melts.

The gadolinium-acetate solution system of FIG. 1 with a gadolinium content of 5 weight % in the aqueous solution has been found to be especially advantageous for the shutdown of nuclear reactors during the first or startup phase in which the nuclear reactor core is still at a relatively low temperature. If, during the startup phase, shutdown is required, the nuclear reactor is readily uniformly wetted with the solution to maintain the nuclear fuel elements in a subcritical stage. The aqueous gadolinium acetate solution has also been found to be advantageous for a so-called hot-shutdown of the nuclear reactor under full load. i.e. for emergency shutdown. A restarting of the nuclear reactor after introduction of the gadolinium acetate solution is attained by the nuclear burnoff of the gadolinium.

The system FIG. 2 has also been found to be advantageous for startup-phase shutdowns of nuclear reactors in which the shutdown occurs while the temperature of the reactor core is between 160° C. and 380° C. In the temperature range between 80° C. and 350° C., gadolinium-aluminum-isopropoxide is preferred while the shutdown in the range between 160° C. and 380° C. preferably uses gadolinium tricyclopentadienyl. Thus any given reactor can be provided with all three types of shutdown systems using all three of the compounds. In a shutdown under full load, the gadolinium tricyclopentadienyl or the gadolinium aluminum isopropoxide is subjected to practically immediate and general pyrolysis, the pyrolysis diminishing as the temperature in the reactor core drops. Gadolinium tricyclopentadienyl has a vapor phase at temperatures below about 380° C. which can be utilized to sweep the gadolinium tricyclopentadienyl from the system or is lasting so as to require concern. The gadolinium deposited on the surfaces of the nuclear-fuel elements is thermally desorbed and/or nuclearly burned off for startup.

For a high-temperature nuclear reactor with a thermal output of 3000 MW for so-called hot shutdown, a reactivity reduction of about 3 Nile is required, necessitating about 500 grams of gadolinium in the reactor core. It has been found to be advantageous, therefore, to store 150 g in in the storage vessel for each Nile of reactivity reduction which is required.

We claim:

1. A process for reducing the reactivity of a nuclear reactor of the type in which a primary coolant gas is passed into direct contact in a reactor core with the graphite surfaces of nuclear-fuel elements constituted by graphite bodies containing fissionable fuel, said process comprising introducing from a location outside of said core into the primary coolant gas for entrainment by the primary coolant gas into contact with the surfaces of said fuel elements, a gadolinium$^{157}$-containing substance which is at least partly deposited on said surface for adsorption of neutron flux whereby the gadolinium$^{157}$ undergoes at least in part a nuclear transmission to gadolinium$^{158}$.

2. The process defined in claim 1 wherein the gadolinium$^{157}$-containing substance is metered into said reactor in dependence upon the predetermined degree of activity reduction required.

3. The process defined in claim 1 wherein the gadolinium$^{157}$-containing substance is sprayed into the primary coolant gas upon its entry into the reactor in the form of an aqueous gadolinium acetate solution.

4. The process defined in claim 3 wherein said gadolinium acetate solution contains up to 5 percent by weight of gadolinium acetate.

5. The process defined in claim 1 wherein the gadolinium$^{157}$-containing substance is an organic compound of gadolinium stable to a temperature of at least 150° C. and having a vapor pressure at a temperature up to 500° C. sufficient to introduce a significant amount of the gadolinium-containing substance into a gas stream, said gadolinium-containing substance being carried by a gas stream for deposition in predetermined quantities onto the free graphite surfaces of said elements.

6. The process defined in claim 5 wherein that organic gadolinium compound is gadolinium-tricyclopentadienyl.

7. The process defined in claim 6 wherein the gas stream entraining the gadolinium-containing compound into the reactor is passed over solid gadolinium-tricyclopentadienyl thereby introducing vapors thereof into the gas stream.

8. The process defined in claim 5 wherein the gadolinium-containing compound is gadolinium aluminum isopropoxide.

9. The process defined in claim 8 wherein the gadolinium-containing substance is introduced into the gas stream by passing the gas stream into contact with a fiber fleece impregnated with the gadolinium aluminum isopropoxide.

10. A method of operating a nuclear reactor which comprises the steps of:
 (a) assembling a multiplicity of nuclear-fuel elements in a nuclear reactor core below a top reflector, said nuclear fuel elements having exposed graphite surfaces and being composed of graphite bodies in which a fissionable fuel is embedded;
 (b) sustaining a neutron flux in said reactor core in a fission chain reaction;
 (c) cooling said reactor core by circulating a coolant gas through said reactor core into direct contact with said surfaces in a primary coolant cycle;
 (d) abstracting heat from the primary gas coolant by a secondary coolant;
 (e) controlling the reactivity of said core by selectively introducing from a location outside of said core into the primary gas coolant before it contacts said elements, a gadolinium$^{157}$-containing substance selected from the group which consists of water-soluble gadolinium salts in aqueous solution and vapors of an organic gadolinium compound stable to a temperature of at least 150° C., thereby entraining the gadolinium$^{157}$-containing substance in said primary gas coolant and depositing said gadolinium-containing substance on said surface of said elements from said primary gas coolant in an amount sufficient to absorb neutrons of said flux, the gadolinium of said substance being transformed by nuclear reaction to gadolinium$^{158}$, an element having reduced neutron-absorption cross section, by the nuclear reaction; and
 (f) shutting down said reactor at least in an emergency by introducing into said reactor core an increased quantity of the gadolinium$^{157}$-containing substance.

11. The method defined in claim 10 wherein the primary cooling gas is introduced into the nuclear reactor between the top reflector and an uppermost layer of said fuel elements of said core, said gadolinium$^{157}$-containing substance being introduced by spraying an aqueous solution of gadolinium acetate into the primary cooling gas between said top reflector and said layer.

12. The method defined in claim 10 wherein a quantity of aqueous solution of gadolinium acetate is discharged into said core under the natural head of the aqueous solution upon the melting of a fusible body for shutdown of said reactor.

13. The method defined in claim 10 wherein said gadolinium-containing substance is introduced into the primary cooling gas prior to its entry into said reactor by by-passing a portion of the primary coolant gas from the mainstream thereof into contact with gadolinium-tricyclopentadienyl or gadolinium-aluminum-isopropoxide and then returning the by-passed portion to the main primary cooling gas stream before it enters said reactor.

14. The method defined in claim 10 wherein the gadolinium-containing substance is introduced into the reactor in a gas stream which is passed over a quantity of gadolinium-tricyclopentadienyl or gadolinium-aluminum-isopropoxide the gas being heated prior to contact with the gadolinium-containing substance.

15. A shutdown system for carrying out the process defined in claim 1 for a gas-cooled nuclear reactor having a reactor core provided with a pile of nuclear fuel elements constituted by graphite bodies in which fissionable fuel is embedded and having free graphite surfaces, and a primary cooling gas cycle for passing a primary cooling gas through said core in direct contact with the surfaces of said elements, said shutdown system comprising means outside of said core for introducing a gadolinium$^{157}$-containing substance into the primary cooling gas prior to its contact with said elements whereby said gadolinium-containing substance is deposited at least in part onto said surfaces of said elements from said gas.

16. The shutdown system defined in claim 15 wherein the last mentioned means includes spray nozzles disposed in the reactor in the region in which said gas is introduced for spraying the gadolinium-containing substance into said gas, a spray vessel for said gadolinium-containing substance, and conduit means including at least one conduit connected to said vessel and to said nozzles for feeding said substance to said nozzles, and pressure resistant valve means in said conduit means between said reactor and said vessel.

17. The system defined in claim 16 wherein said nozzles open into said reactor between a cover reflector and an uppermost layer of said elements of the reactor core, said nozzles being provided in number and throughput in dependence upon the neutron flux distribution of said core upon restarting of the reactor.

18. The system defined in claim 16 wherein at least one metering pump is provided in said conduit means between said vessel and said reactor for metering the flow of said substance to at least one of said nozzles.

19. The system defined in claim 18 wherein said conduit means includes at least one conduit connecting said vessel with said reactor for discharge of the contents of said vessel by the natural head of said substance into said reactor, and a fusible member blocking the latter conduit whereby the development of excess temperature in said reactor melts said member and discharges said vessel into said reactor.

20. The system defined in claim 15 wherein said primary cooling gas cycle is provided with a by-pass ahead of the reactor, said by-pass including a gastight spray vessel receiving said gadolinium-containing substance and valve means for selectively opening and closing said by-pass whereby a portion of the primary cooling gas can be diverted to said vessel prior to its introduction into the reactor to entrain said gadolinium-containing substance therewith.

21. The system defined in claim 20 wherein said valve means is impermeable by said gadolinium-containing substance in the closed condition of said valve means.

22. The system defined in claim 20 wherein said vessel is provided with an atmosphere corresponding to said gas and means is provided for pressure equalization between the primary cooling gas and the interior of the vessel.

23. The system defined in claim 15 wherein the means for introducing the gadolinium-containing substance into the reactor comprises a reservoir for a gas, and a vessel receiving said gadolinium-containing substance connected to said reservoir and communicating with said reactor.

24. The system defined in claim 23, further comprising heating means between said reservoir and said vessel for raising the temperature of the gas of said reservoir prior to its introduction into said reactor.

25. The system defined in claim 15 wherein the means for introducing the gadolinium-containing substance into the reactor includes a grid of gadolinium-tricyclopentadienyl through which gas is passed to entrain vapors of the gadolinium-tricyclopentadienyl into the reactor.

26. The system defined in claim 15 wherein the means for introducing said gadolinium-containing substance into said reactor includes means for passing a gas over vapor fleece impregnated with the gadolinium-aluminum-isopropoxide for entraining vapors thereof into said reactor.

27. The system defined in claim 15 wherein said reactor is provided with an auxiliary coolant conduit, the means for introducing a by-pass from the auxiliary coolant conduit, and a vessel containing said substance provided along said by-pass.

* * * * *